(12) United States Patent
Zhang et al.

(10) Patent No.: US 11,524,401 B1
(45) Date of Patent: Dec. 13, 2022

(54) LEARNING SKILLS FROM VIDEO DEMONSTRATIONS

(71) Applicants: Jian Zhang, San Jose, CA (US); Mario J. Srouji, San Jose, CA (US); Ruslan Salakhutdinov, Pittsburgh, PA (US)

(72) Inventors: Jian Zhang, San Jose, CA (US); Mario J. Srouji, San Jose, CA (US); Ruslan Salakhutdinov, Pittsburgh, PA (US)

(73) Assignee: APPLE INC., Cupertino, CA (US)

( * ) Notice: Subject to any disclaimer, the term of this patent is extended or adjusted under 35 U.S.C. 154(b) by 315 days.

(21) Appl. No.: 16/829,277

(22) Filed: Mar. 25, 2020

Related U.S. Application Data (60) Provisional application No. 62/852,799, filed on May 24, 2019, provisional application No. 62/825,289, filed on Mar. 28, 2019.

(51) Int. Cl.
| | |
|---|---|
| *G05B 19/04* | (2006.01) |
| *B25J 9/16* | (2006.01) |
| *G06T 7/20* | (2017.01) |
| *G06N 20/00* | (2019.01) |
| *G06N 5/04* | (2006.01) |
| *G05B 13/02* | (2006.01) |

(52) U.S. Cl.
CPC ............ *B25J 9/163* (2013.01); *B25J 9/1671* (2013.01); *G05B 13/028* (2013.01); *G06N 5/04* (2013.01); *G06N 20/00* (2019.01); *G06T 7/20* (2013.01); *G06T 2207/10016* (2013.01); *G06T 2207/20081* (2013.01); *G06T 2207/30196* (2013.01)

(58) Field of Classification Search
CPC ........... B25J 9/163; B25J 9/1671; G06T 7/20; G06T 2207/30196; G06T 2207/10016; G06T 2207/20081; G06N 20/00; G06N 5/04; G05B 13/028

USPC ........ 700/246, 245, 247, 249, 250, 253, 254
See application file for complete search history.

(56) References Cited

U.S. PATENT DOCUMENTS

| 7,657,345 B2 | 2/2010 | Endo et al. |
| 9,146,546 B2 | 9/2015 | Sinyavskiy et al. |

FOREIGN PATENT DOCUMENTS

| JP | 4773680 B2 * | 9/2011 |
| WO | 2018071392 A1 | 4/2018 |
| WO | 2019002465 A1 | 1/2019 |

OTHER PUBLICATIONS

Xu, Danfei, et al., "Neural Task Programming: Learning to Generalize Across Hierarchical Tasks", Cornell University, https://arxiv.org/abs/1710.01813, Mar. 14, 2018 (8 pp).

(Continued)

*Primary Examiner* — Robert Chevalier
(74) *Attorney, Agent, or Firm* — Young Basile Hanlon & MacFarlane, P.C.

(57) ABSTRACT

A method includes determining motion imitation information for causing a system to imitate a physical task using a first machine learning model that is trained using motion information that represents a performance of the physical task, determining a predicted correction based on the motion information and a current state from the system using a second machine learning model that is trained using the motion information, determining an action to be performed by the system based on the motion imitation information and the predicted correction; and controlling motion of the system in accordance with the action.

20 Claims, 7 Drawing Sheets

(56) References Cited

OTHER PUBLICATIONS

Sermanet, P., et al., "Unsupervised Perceptual Rewards for Imitation Learning", Robotics: Science and Systems 2017, Jul. 12, 2017 (9 pp).

Tzeng, E., et al., "Adapting Deep Visuomotor Representations with Weak Pairwise Constraints", Cornell University, https://arxiv.org/abs/1511.07111, May 25, 2017 (16 pp).

Tobin, J., et al., "Domain Randomization for Transferring Deep Neural Networks from Simulation to the Real World", Cornell University, https://arxiv.org/abs/1703.06907, Mar. 20, 2017 (8 pp).

Christiano, P., et al., "Transfer from Simulation to Real World through Learning Deep Inverse Dynamics Model", Cornell University, https://arxiv.org/abs/1610.03518, Oct. 11, 2016 (8 pp).

Yan, M., et al., "Sim-to-Real Transfer of Accurate Grasping with Eye-In-Hand Observations and Continuous Control", 31st Conference on Neural Information Processing Systems (NIPS 2017), (10 pp).

Peng, X. B.., et al., "Sim-to-Real Transfer of Robotic Control With Dynamics Randomization", 2018 IEEE International Conference on Robotics and Automation (ICRA), May 21, 2018 (8 pp).

Golemo, F., et al., "Sim-to-Real Transfer with Neural-Augmented Robot Simulation", 2nd Conference on Robot Learning (CoRL 2018), (12 pp).

Chebotar, Y., et al., "Closing the Sim-to-Real Loop: Adapting Simulation Randomization with Real World Experience", Cornell University, https://arxiv.org/abs/1810.05687, Mar. 5, 2019 (10 pp).

Tan, J., et al., "Sim-to-Real: Learning Agile Locomotion for Quadruped Robots", Robotics: Science and Systems 2018, Jun. 26, 2018 (11 pp).

Rusu, A. A., et al., "Sim-to-Real Robot Learning from Pixels With Progressive Nets", Cornell University, https://arxiv.org/abs/1610.04286, May 22, 2018 (9 pp).

Peng, X., et al., "DeepMimic: Example-Guided Deep Reinforcement Learning of Physics-Based Character Skills", ACM Trans. Graph., vol. 37, No. 4, Article 143, Publication Date: Aug. 2018 (18 pp).

Molchanov, A., et al., "Sim-to-{Multi}-Real: Transfer of Low-Level Robust Control Policies to Multiple Quadrotors", https://www.researchgate.net/publication/331700208, Apr. 16, 2019 (10 pp).

Yu, W., et al., "Sim-to-Real Transfer for Biped Locomotion", arXiv:1903.01390v2 [cs.RO] Aug. 25, 2019, (8 pp).

Lee, J., et al., "Robust Recovery Controller for a Quadrupedal Robot using Deep Reinforcement Learning", arXiv:1901.07517v1 [cs.RO] Jan. 22, 2019 (9 pp).

Hwangbo, J., et al., "Learning Agile and Dynamic Motor Skills for Legged Robots", arXiv:1901.08652v1 [cs.RO] Jan. 24, 2019, (20 pp).

Koenemann, J., et al., "Real-time Imitation of Human Whole-Body Motions by Humanoids", https://www.researchgate.net/publication/266640150, Conference Paper: May 2014 (8 pp).

Schulman, J., et al., "Proximal Policy Optimization Algorithms", arXiv:1707.06347v2 [cs.LG] Aug. 28, 2017, (12 pp).

Kanazawa, A., et al., "End-to-end Recovery of Human Shape and Pose", arXiv:1712.06584v2 [cs.CV] Jun. 23, 2018 (10 pp).

Peng, X., et al., "Sim-to-Real Transfer of Robotic Control with Dynamics Randomization", arXiv:1710.06537v3 [cs.RO] Mar. 3, 2018, (8 pp).

Srouji, M., et al., "Structured Control Nets for Deep Reinforcement Learning", arXiv:1802.08311v1 [cs.LG] Feb. 22, 2018, (12 pp).

Peng, X., et al., "SFV: Reinforcement Learning of Physical Skills from Videos", ACM Transactions on Graphics, vol. 37, No. 6, Article 178. Publication date: Nov. 2018 (17 pp).

\* cited by examiner

LEARNING SKILLS FROM VIDEO DEMONSTRATIONS

CROSS-REFERENCE TO RELATED APPLICATIONS

This application claims the benefit of U.S. Provisional Application No. 62/825,289, filed on Mar. 28, 2019, and U.S. Provisional Application No. 62/852,799, filed on May 24, 2019. The contents of the foregoing applications are incorporated herein by reference in their entirety for all purposes.

TECHNICAL FIELD

This disclosure relates to the field of machine learning.

BACKGROUND

Humans are capable of performing complex physical tasks. Robots must be trained to perform these types of tasks. Reinforcement techniques that simulate performance of tasks by robots have been used to train robots. However, multiple types of errors (e.g., modelling errors) cause the conditions in a simulation to differ from real-world conditions. This can cause models that are successful in performing tasks in a simulation to fail when they are used to control real-world robotic systems, in what is commonly referred to as the sim-to-real gap.

SUMMARY

One aspect of the disclosure is a method that includes determining motion imitation information for causing a system to imitate a physical task using a first machine learning model that is trained using motion information that represents a performance of the physical task, determining a predicted correction based on the motion information and a current state from the system using a second machine learning model that is trained using the motion information; determining an action to be performed by the system based on the motion imitation information and the predicted correction; and controlling motion of the system in accordance with the action.

In some implementations, the motion information is based on a video that shows a demonstration of the physical task by an actor. The motion information may describe positions of parts of the actor at each of multiple time steps.

In some implementations, determining the predicted correction based on the motion information and the current state from the system comprises determining a motion representation code that is provided to the second machine learning model as an input. The motion representation code may be a fixed-length value that represents motions that are present in a portion of the motion information.

In some implementations, determining the predicted correction based on the motion information and the current state from the system comprises determining a tracking error that represents a difference between the current state and the motion information, wherein the tracking error is provided to the second machine learning model as an input.

In some implementations, the system is a simulated system and an error value for the simulated system is used as a supervision signal for reinforcement learning. In some implementations, the system is a robotic system.

Another aspect of the disclosure is a method that includes determining motion information that represents performance of a physical task, training a first machine learning model to determine motion imitation information for causing a system to imitate the physical task using the motion information, training a second machine learning model to determine a motion representation code that represents the motion information, training a third machine learning model according to a reinforcement learning technique based on a supervision signal to determine a predicted correction using the motion representation code and a current state of a simulated system, determining an action to be performed by the simulated system based on the motion imitation information and the predicted correction, and simulating performance of the action in the simulated system, wherein the supervision signal is determined in accordance with performance of the action in the simulated system.

The motion information may be based on a video that shows a demonstration of the physical task by an actor, the motion information may describe positions of parts of the actor at each of multiple time steps, and the parts of the actor may be joints. The motion representation code may be a fixed-length value that represents motions that are present in a portion of the motion information. The supervision signal may represent an error of the performance of the action in the simulated system relative to the performance of the physical task.

Another aspect of the disclosure is a method that includes determining a first distribution for a motion dynamics parameter according to a first uncertainty value, and performing iterations of a first training operation for a machine learning model using a simulator and the first distribution for the motion dynamics parameter, wherein each iteration of the first training operation includes determining a first sampled value from the first distribution and controlling a simulation using the first sampled value. The method also includes determining a second distribution for the motion dynamics parameter according to a second uncertainty value, wherein the second uncertainty value represents a higher level of uncertainty than the first uncertainty value, and performing iterations of a second training operation for the machine learning model using a simulator and the first distribution for the motion dynamics parameter, wherein each iteration of the second training operation includes determining a second sampled value from the second distribution and controlling the simulation using the second sampled value.

In some implementations of the method, each iteration of the first training operation comprises causing a simulated actor to perform a task in the simulation according to the first sampled value from the first distribution and each iteration of the second training operation comprises causing the simulated actor to perform the task in the simulator according to the second sampled value.

In some implementations of the method, each iteration of the first training operation comprises determining a first training signal based on the simulation and modifying the machine learning model according to the first training signal, and each iteration of the second training operation comprises determining a second training signal based on the simulation and modifying the machine learning model according to the second training signal.

Some implementations of the method also include initially training the machine learning model using a demonstration of a physical task. The demonstration of the physical task may include a video that depicts a human actor performing the physical task.

Some implementations of the method may also include controlling a robotic system using the machine learning model.

DETAILED DESCRIPTION

Designing complex physical skills for humanoid robots is challenging with traditional motion planning and dynamic control methods. Learning from demonstration can provide an efficient and effective way of directly acquiring desired skills and behaviors.

A longstanding limitation in designing diverse behaviors and physical skills for humanoid robots is scalability. Traditional methods such as motion planning and dynamic control are effective for particular tasks but fail short of scaling and generalizing, owing to the demands of domain-specific knowledge and hand-tuning.

Reinforcement Learning (RL) and Imitation Learning have been used to solve various virtual and real robotic problems. For legged robots and humanoids, most previous work focuses on solving the locomotion problem of biped and quadruped robots.

The systems and methods described herein include data-driven methods to teach and learn various behaviors in physical simulations. These behaviors include physical skills beyond simple locomotion. Reference motions are learned from video demonstrations directly using pose estimation and do not require a three-dimensional motion capture system. Motion control policies are trained with Deep Reinforcement Learning and imitation rewards are defined to track the estimated reference motions as closely as possible in physics simulations, thus enabling robust and adaptive policies.

Due to the sim-to-real reality gap of robotics applications, polices learned in simulations typically do not work in the real world, especially when trained with Deep Reinforcement Learning. In the systems and methods described herein, training is performed using motion dynamics that are subject to increasing levels of uncertainty to transfer the learned policies from simulation to real robots.

Figure 1:
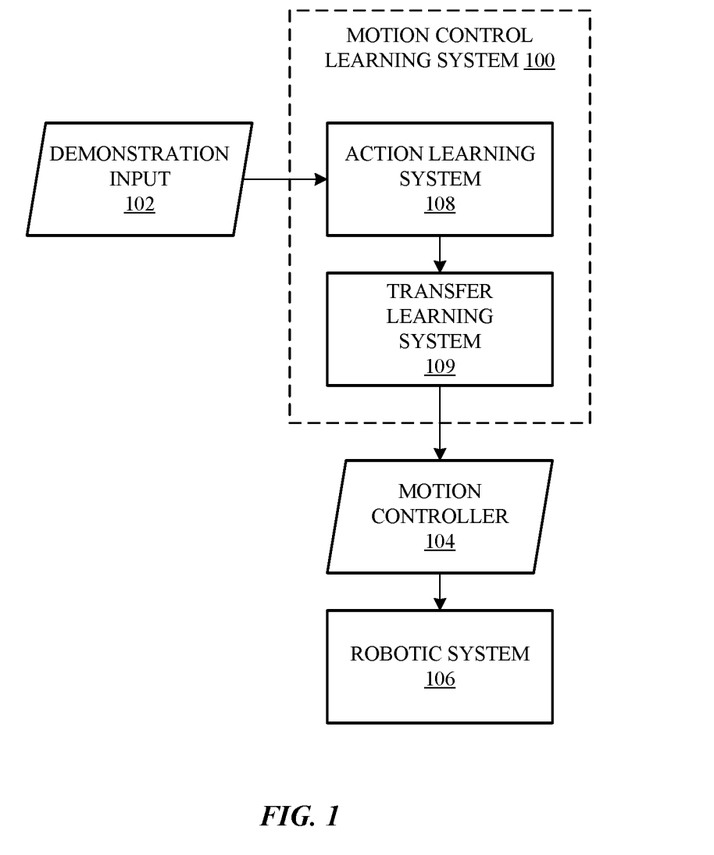
FIG. 1 is a block diagram that shows a motion control learning and transfer system.

FIG. 1 is a block diagram that shows a motion control learning system 100. As an input, the motion control learning system 100 accepts a demonstration input 102. As an output, the motion control learning system 100 a motion controller 104. The motion controller 104 is configured to control motion of a robotic system 106.

The demonstration input 102 is a video that shows a task being performed by an actor. The actor that is performing the task and the task being performed will vary. As one example, the actor performing the task may be a person. As another example, the actor performing the task may be a machine or a robotic system (e.g., under manual control by a human operator). The task may be selected from many different types of tasks that involve physical motion. Examples of tasks include walking, running, performing jumping jacks, picking up an object, placing an object in a container, stacking objects, folding clothing or other soft goods, assembling an article, using a tool, cutting food, etc.

In one implementation, the demonstration input 102 is limited to showing one type of task that is performed by one actor (e.g., a single person). In an alternative implementation, the demonstration input 102 may show the same task performed multiple times by one actor. In an alternative implementation, the demonstration input 102 may show the same task being performed multiple times, with each of two or more actors each performing the task at least once.

The motion controller 104 is a trained machine learning model. The motion controller 104 is configured, by the motion control learning system 100, to cause the robotic system 106 to perform an action that is equivalent to the action that was shown in the demonstration input 102.

The motion control learning system 100 includes an action learning system 108 and a transfer learning system 109. The action learning system 108 uses a simulator to train a machine learning model to cause a simulated robotic system to perform the action that is shown in the demonstration input 102 within the context of the simulator. The transfer learning system 109 further trains the machine learning model produced by the action learning system 108 to allow it to function properly when transferred to the robotic system 106, in light of the differing dynamic conditions that may be experienced by the robotic system 106 as opposed to those modeled within the simulator. The action learning system 108 and the transfer learning system 109 will be explained further herein.

Figure 2:
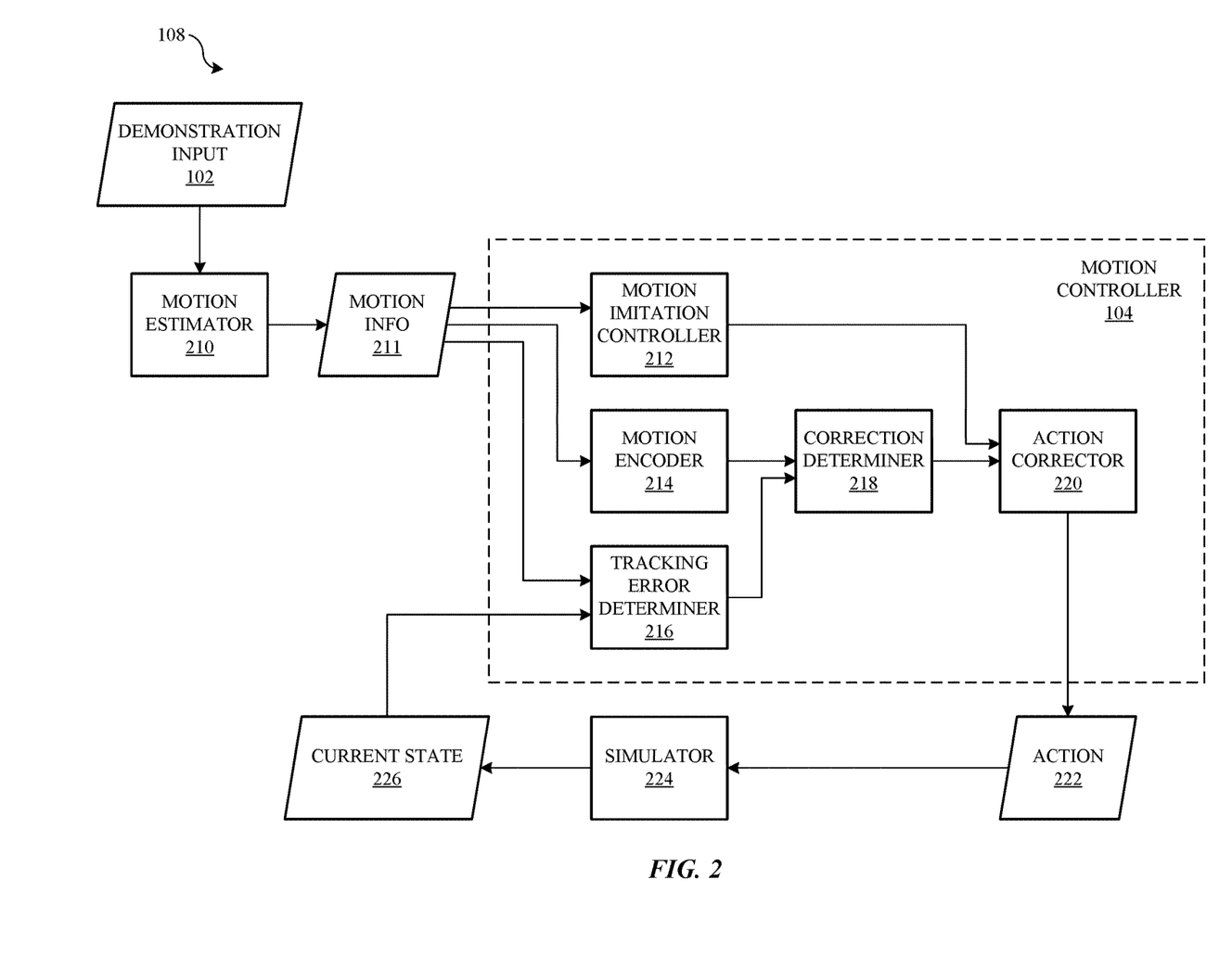
FIG. 2 is a block diagram that shows an action learning system of the motion control learning and transfer system.

FIG. 2 is a block diagram that shows the action learning system 108. The action learning system 108 is configured to train the motion controller 104 to perform actions that are shown in the demonstration input 102. The action learning system 108 includes a motion estimator 210 that receives the demonstration input 102 as an input, a motion imitation controller 212, a motion encoder 214, a tracking error determiner 216, a correction determiner 218, an action corrector 220. An action 222 is determined by the action corrector and is used as an input to a simulator 224. Information regarding simulated actor states is output by the simulator as a current state 226 that is provided to the tracking error determiner 216 as an input.

The motion estimator 210 is configured to determine motion information 211 that describes the motion of an actor that is shown in the demonstration input 102. The demonstration input 102 is received by and processed by the motion estimator 210. The motion information 211 may describe a segment of the video from the demonstration input 102 over a time period. The motion information 211 that is determined by the motion estimator 210 is a motion model that describes the motion in the demonstration input 102 (e.g., including a video).

The processing performed by the motion estimator 210 may include analyzing the actor that is shown in the demonstration input 102 in order to determine locations of joints. For a human actor, joints that are identified by the motion estimator 210 may represent skeletal joints of the human body, such as knee joints and elbow joints. In examples where the actor is a machine, the joints may be mechanical joints (e.g., hinges, rotary joints, etc.). Connections between joints may also be identified by the motion estimator 210.

Over multiple frames of video, joints and connections between joints are tracked, and these motions and relative positions are included in motion information 211.

The motion estimator 210 may be implemented using known machine vision techniques that are able to identify objects in images, identify portions of objects in images (e.g., joints), and identify motion of objects and portions of objects in a series. As one example, the motion information 211 that is output by the motion estimator 210 may be output as time-series data that describes the locations of joints, connections between joints, and/or other features of the actor.

The motion imitation controller 212 receives the motion information 211 from the motion estimator 210 and is configured to exercise forward-looking and global control of the overall motion to be imitated by the simulated actor. As an action is performed, the motion imitation controller 212 outputs control information that describes the motion at the current time step as represented in the motion information 211 that is received from the motion estimator 210. The motion imitation controller 212 may be implemented using a machine learning model, such as a neural network, that learns a relationship between the state shown in the motion information 211 output by the motion estimator 210 based on the demonstration input 102 and the desired state of the actor in the simulation that is needed to imitate the motion.

The motion encoder 214 is a trained machine learning model that receives the motion information 211 from the motion estimator 210 and outputs a motion representation code. The motion representation code is a fixed-length value that describes the motions that are present in the demonstration input 102, as identified by the motion estimator 210 and the motion information 211 that is output by the motion estimator 210. The motion representation code may be decoded (e.g., by a motion decoder that is implemented in the form of a trained machine learning model) to recover the motions from the motion information 211 output by the motion estimator 210.

The motion encoder 214 may be trained by a self-supervised learning process in which the motion information 211 is encoded by the motion encoder 214 to determine the motion representation codes, and the motion representation code is then decoded to determine a reconstructed version of the motion information 211. Reconstruction error is determined based on the difference between the motion information 211 and the reconstructed motion information, and the reconstruction error is used as a supervision signal for training the motion encoder 214 and the corresponding motion decoder.

The tracking error determiner 216 receives the motion information 211 from the motion estimator 210 and also receives the current state 226 from the simulator 224 as an input. The current state 226 describes the current position of the simulated actor in the simulator 224 and may also include other information that describes motion of the simulated actor in the simulator 224. Using the motion information 211 and the current state 226, the tracking error determiner 216 determines a tracking error, which is a difference between the state of the motion shown in the demonstration input 102 as described by the motion estimator 210 in the motion information 211 for the current time step and the current state 226 for the current time step.

As one example, the motion information 211 and the current state may each include joint position information for the actor in the demonstration input 102 and the simulated actor from the simulator 224. A difference in the joint position information is determined on a joint-by-joint basis, and these values are included in the tracking error. Other manners of calculating and/or representing the tracking error may be used.

The correction determiner 218 receives the motion representation code from the motion encoder 214 and the tracking error from the tracking error determiner 216 as inputs, and generates an action correction as an output. The correction determiner 218 intended to cause the motion controller 104 to reduce a deviation between the motion from the demonstration input 102 and the motion of the simulated actor in the simulator 224.

The correction determiner 218 is conditioned on the motion representation code. The motion representation code may be used by the correction determiner 218 to predict the motion that will be performed in the demonstrated action in one or more future time steps. This allows the action correction to be determined based on expected future motion, which allows for motion-specific control (i.e., control that is specific to the type of motion being performed as described by the motion representation code) to be performed as opposed to applying the same type of correction to all deviations independent of the type of motion of action being performed.

The correction determiner 218 may be implemented in the form of a neural network that is trained using reinforcement learning techniques that are configured to reward the correction determiner 218 when the simulated actor in the simulator 224 correctly imitates the motion from the demonstration input 102. Thus, the tracking error from the tracking error determiner 216 may serve as a supervision signal for reinforcement learning as well as serving as an input.

The action correction that is determined by the correction determiner 218 is provided to the action corrector 220 as an input. The action corrector 220 also receives the motion imitation information from the motion imitation controller 212 at the current time step. The action corrector combines the motion imitation information from the motion imitation controller 212 with the action correction from the correction determiner 218 to determine the action 222 at the current time step. In one implementation, the motion imitation information is expressed in the form of joint positions and the action correction is expressed in the form of position corrections to be applied to each joint. In such an implementation, the action 222 may include target joint positions for the current time step that are determined as a summation of the motion imitation information and the action correction.

The action 222 is passed to the simulator 224 as an input. The simulator 224 attempts to control the simulated actor in a manner that is consistent with the action 222. After updating the joint positions and/or other states for the simulated actor in the current time step, the simulator outputs the current state 226 to describe current states for the simulated actor.

The simulator 224 is configured to execute a simulation of the simulated actor attempting to perform that action that is shown in the demonstration input 102. Inherently, the many assumptions are made as to dynamic properties that are used during the simulation. These dynamic properties are intended to model the real-world conditions that will be experienced when the motion controller 104 is transferred to the robotic system 106 for use in controlling the robotic system 106. The dynamic properties for the simulator 224 may be set by a user of the simulator. As examples, the dynamic properties that are used in the simulation may include friction values, masses for objects and portions of the simulated actor, sizes for objects and portions of the simulated actor, actuator properties (e.g., force or velocity resulting from a control signal of a certain magnitude), temperature values, and humidity values. These examples are not exhaustive and other types of motion dynamics will be modeled by the simulator 224.

In the action learning system 108, the dynamic properties that are used by the simulator 224 may be fixed. Thus, the action learning system allows the motion controller 104 to learn how to perform the action shown in the demonstration input 102 using constant and invariant motion dynamics, so that the motion controller 104 may learn to control the simulated actor from the simulator 224 to a high degree of accuracy under fixed dynamic conditions.

In operation, the action learning system 108 is used to train the motion controller 104 to train the simulated actor to perform the task shown in the demonstration input 102. Training iterations (e.g., millions) are performed until the motion controller 104 is able to correctly control the simulated actor within the context of the simulator 224. As an example, "correctness" can be determined by comparing errors (e.g., tracking errors or failed attempts to perform the task) to a threshold value, and determining that the motion controller correctly controls the simulated actor when the error is below a threshold value.

Figure 3:
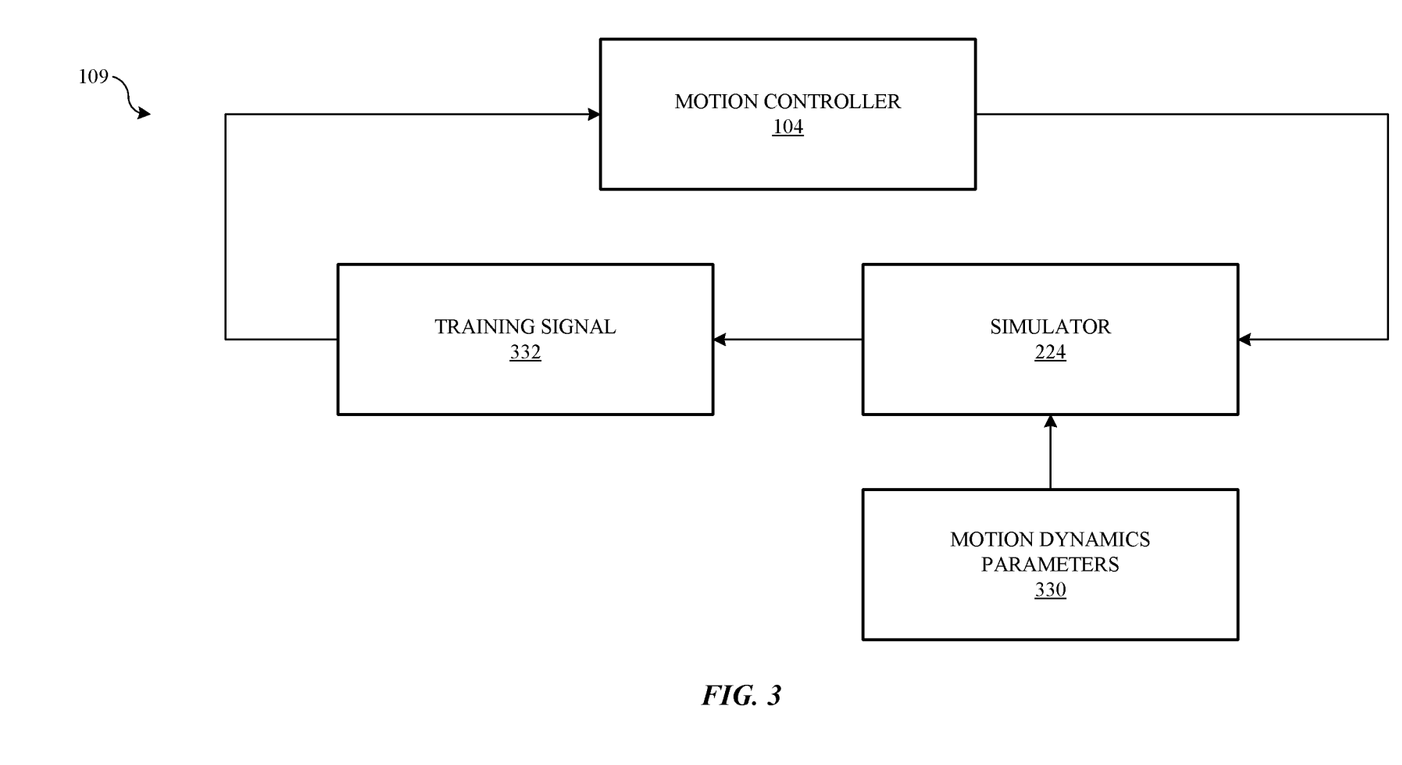
FIG. 3 is a block diagram that shows a transfer learning system of the motion control learning and transfer system.

FIG. 3 is a block diagram that shows the transfer learning system 109. The transfer learning system includes the motion controller 104, the simulator 224, motion dynamics parameters 330 that are used to control operation of the simulator 224, and a training signal 332 generated based on performance of the simulated actor in the simulator 224.

The transfer learning system 109 utilizes reinforcement learning techniques to further train the motion controller 104 after the initial training performed in the action learning system 108 according to the description made in connection with FIG. 2. The training performed in the action learning system 108 may utilize a fixed, ideal set of simulation dynamics for the simulator 224 and the simulated actor. In contrast, the transfer learning system 109 uses varying motion dynamics in order to fine tune the motion controller 104 so that it becomes more robust and is able to operator under conditions that deviate from ideal and/or expected conditions.

The transfer learning system 109 utilizes the motion controller 104 and the simulator 224. The motion controller 104 is trained to perform an action as described with respect to FIG. 2. The motion controller 104 is instructed to control the simulated actor in the simulator 224 to cause the simulated actor to perform the action within the simulation environment that is provided by the simulator. The simulator 224 is provided with a set of motion dynamics parameters 330 that are used to control operation of the simulation including the simulated environment and the simulated actor. The motion dynamic parameters 330 are controllable motion dynamics that can be changed within the simulation environment provided by the simulator, as previously described.

The simulation is performed using the simulator 224 under control of the motion controller 104, and a result is obtained. The result from the simulator is used to generate a training signal 332. The training signal 332 is used, according to reinforcement learning techniques, to modify the motion controller 104 (e.g., by changing weights of the model). As one example, the training signal 332 may indicate whether the task was performed successfully or was not performed successfully. As another example the training signal 332 may be based on a deviation of motion of the simulated actor from a desired motion (e.g., tracking error). Based on the training signal 332, the motion controller 104 is modified after each training iteration.

For each iteration of training that is performed by the transfer learning system, the motion dynamics parameters 330 are sampled from a probabilistic distribution of parameter values. The probabilistic distributions may be distributions of any suitable type that can be used to model the expected ranges and frequencies of values that may be encountered. As one example, a normal distribution may be used.

For each type of motion dynamic that is modeled by the motion dynamics parameters 330, an uncertainty parameter is used to control the amount of variability. As an example, each probabilistic distribution may be generated using the uncertainty parameter, which causes the distribution to model a certain amount of uncertainty. As an example, the uncertainty parameter may be a standard deviation value.

As training continues, the transfer learning system 109 increases the uncertainty parameter that it used to generate the motion dynamics parameters. As an example, a first training operation, a second training operation, (optionally) additional training operations may be performed, where each of the training operations includes numerous training iterations performed at an uncertainty level, and the uncertainty level increases for each subsequent training operation. Each of the first training operation, the second training operation, and subsequent training operations may include a large number (e.g., thousands or millions) of training iterations.

The first training operation uses an initial version of the motion controller 104, as generated by the action learning system 108. In the first training operation, one or more of the motion dynamics parameters 330 are generated according to a first uncertainty value and used in the simulator 224. The first uncertainty value may be used to generate a probabilistic distribution that corresponds to one of the motion dynamics parameters 330 and is used to sample values for the corresponding parameter. The first training operation results in a first enhanced version of the motion controller 104. After the first training operation, a second training operation may be performed in which one or more of the motion dynamics parameters 330 are generated according to a second uncertainty value and used in the simulator 224. The second uncertainty value corresponds to a greater level of variability than the first uncertainty value (e.g., a higher standard deviation value). The second uncertainty value is used to generate a probabilistic distribution that corresponds to one of the motion dynamics parameters 330 and is used to sample values for the corresponding parameter. The second training operation results in a second enhanced version of the motion controller 104. Subsequent training operations may be performed with increased uncertainty for each additional training operation. After a desired number of training operations have been completed, a final version of the motion controller 104 is output and made available for use by the robotic system 106.

Figure 4:
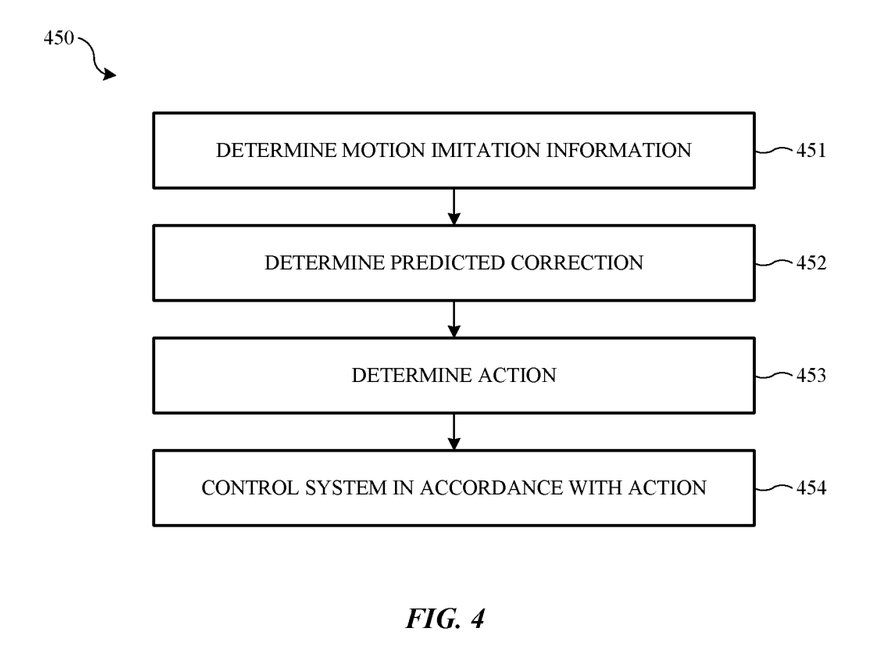
FIG. 4 is a flowchart that shows an example of a process for controlling a system.

FIG. 4 is a flowchart that shows an example of a process 450 for controlling a system. The process 450 can be implemented using a computing device and can be implemented in the context of a physical system or a simulated system. For example, the process 450 can be implemented in the form of a simulated system during training of a machine learning model, and can be implemented in the form of a physical system subsequent to training. The process 450 can be implemented using aspects of the motion control learning system 100 and the motion controller 104. The description made with respect to FIGS. 1-3 is hereby incorporated in the description of the process 450.

The process 450 can implemented in the form of program instructions that are stored in a non-transitory computer-readable storage device. The program instructions are executable by one or more processors to perform the operations described herein with respect to the process 450. The program instructions may be stored in a memory device (e.g., by transferring them from the non-transitory computer-readable storage device to a random-access memory device or other memory device) and the processor may access the instructions from the memory device to execute the program instructions. The instructions cause performance of the process 450 by the computing device. Alternatively, the process 450 can be implemented directly in hardware, firmware, or software, circuitry, or a combination thereof.

Operation 451 includes determining motion imitation information for causing a system to imitate a physical task using a first machine learning model, such as the motion imitation controller 212, that is trained using motion information that represents a performance of the physical task.

The motion information may be based on a video that shows a demonstration of the physical task by an actor, as explained with respect to the demonstration input 102. The motion information may describe positions of parts of the actor at each of multiple time steps as explained with respect to the motion estimator 210 and the motion information 211.

Operation 452 includes determining a predicted correction based on the motion information and a current state from the system using a second machine learning model that is trained using the motion information. Operation 452 may be implemented in the manner described with respect to the motion encoder 214, the tracking error determiner 216, and the correction determiner 218.

In some implementations, determining the predicted correction based on the motion information and the current state from the system comprises determining a motion representation code, for example, in the manner described with respect to the motion encoder 214. The motion representation code is provided to the second machine learning model as an input. As an example, the second machine learning model may be the correction determined 218 of the action learning system 108. The motion representation code may be a fixed-length value that represents motions that are present in a portion of the motion information 211. As an example, the portion of the motion information may represent motion over several time steps based on movement of the actor in the demonstration input 102 during multiple video frames.

In some implementations, determining the predicted correction based on the motion information and the current state from the system comprises determining a tracking error that represents a difference between the current state and the motion information, as described with respect to the tracking error determiner 216. The tracking error may be provided to the second machine learning model as an input.

Operation 453 includes determining an action to be performed by the system based on the motion imitation information and the predicted correction. Operation 453 may be implemented in the manner described with respect to the action corrector 220 and the action 222.

Operation 454 includes controlling motion of the system in accordance with the action. Operation 454 may be implemented in the manner described with the simulator 224 and/or the robotic system 106

During training operations, the system may be a simulated system, such as the simulator 224, and an error value for the simulated system may be determined, for example, based on a difference between motion of the system and motion of an actor in a demonstration. The error value may be used as a supervision signal for reinforcement learning. Subsequent to training, the system may be a robotic system, such as the robotic system 106.

Figure 5:
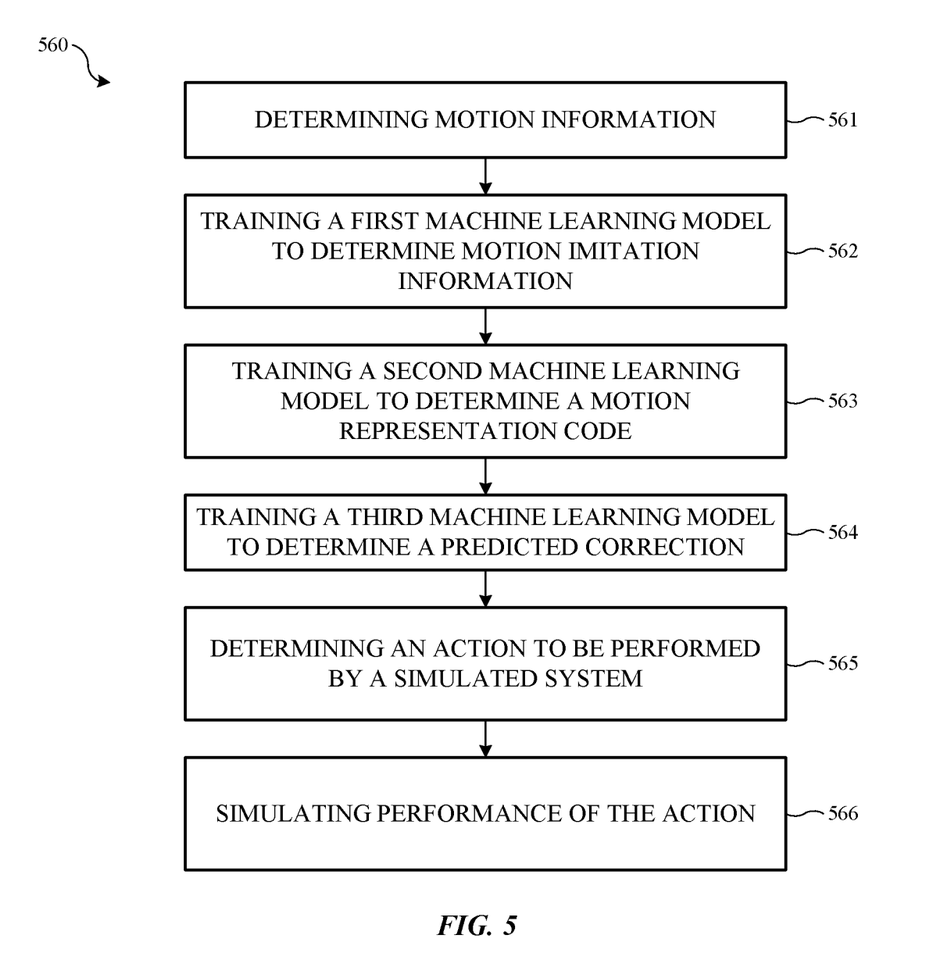
FIG. 5 is a flowchart that shows an example of a process for training a machine learning model.

FIG. 5 is a flowchart that shows an example of a process 560 for training a machine learning model. The process 560 can be implemented using a computing device and can be implemented in the context of a physical system or a simulated system. For example, the process 560 can be implemented in the form of a simulated system during training of a machine learning model, and can be implemented in the form of a physical system subsequent to training. The process 560 can be implemented using aspects of the motion control learning system 100 and the motion controller 104. The description made with respect to FIGS. 1-3 is hereby incorporated in the description of the process 560.

The process 560 can implemented in the form of program instructions that are stored in a non-transitory computer-readable storage device. The program instructions are executable by one or more processors to perform the operations described herein with respect to the process 560. The program instructions may be stored in a memory device (e.g., by transferring them from the non-transitory computer-readable storage device to a random-access memory device or other memory device) and the processor may access the instructions from the memory device to execute the program instructions. The instructions cause performance of the process 560 by the computing device. Alternatively, the process 560 can be implemented directly in hardware, firmware, or software, circuitry, or a combination thereof.

Operation 561 includes determining motion information that represents performance of a physical task. Operation 561 may be performed in the manner described with respect to the motion estimator 210 and the motion information 211. The motion information may be based on a video that shows a demonstration of the physical task by an actor, as described with respect to the demonstration input 102. The motion information 211 may describe positions of parts of the actor that is depicted in the demonstration input 102 at each of multiple time steps. The parts of the actor may be joints, as previously described.

Operation 562 includes training a first machine learning model, such as the motion imitation controller 212, to determine motion imitation information for causing a system to imitate the physical task using the motion information.

Operation 563 includes training a second machine learning model, such as the motion encoder 214, to determine a motion representation code that represents the motion information. The motion representation code may be a fixed-length value that represents motions that are present in a portion of the motion information 211.

Operation 564 includes training a third machine learning model according to a reinforcement learning technique based on a supervision signal to determine a predicted correction using the motion representation code and a current state of a simulated system. The supervision signal may represent an error of the performance of the action in the simulated system relative to the performance of the physical task.

Operation 565 includes determining an action to be performed by the simulated system based on the motion imitation information and the predicted correction.

Operation 566 includes simulating performance of the action in the simulated system, wherein the supervision signal is determined in accordance with performance of the action in the simulated system. Operation 566 may be performed in the manner described with respect to the simulator 224.

Figure 6:
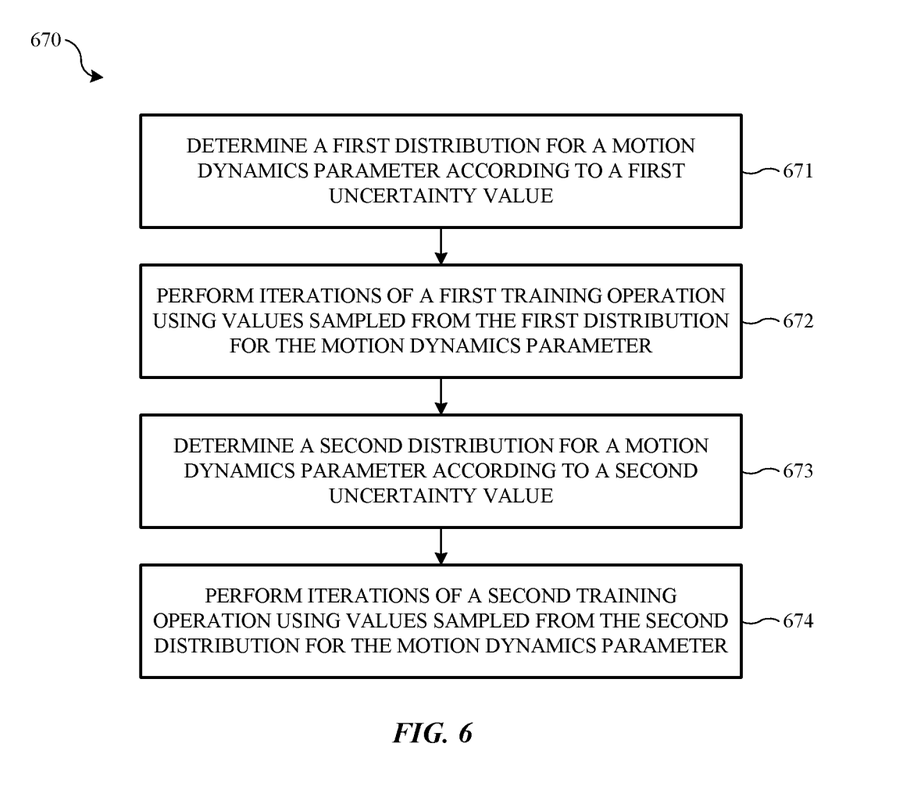
FIG. 6 is a flowchart that shows an example of a process for training a machine learning model.

FIG. 6 is a flowchart that shows an example of a process 670 for training a machine learning model. The process 670 can be implemented using a computing device and can be implemented in the context of a physical system or a simulated system. For example, the process 670 can be implemented in the form of a simulated system during training of a machine learning model, and can be implemented in the form of a physical system subsequent to training. The process 670 can be implemented using aspects of the motion control learning system 100 and the motion controller 104. The description made with respect to FIGS. 1-3 is hereby incorporated in the description of the process 670.

The process 670 can implemented in the form of program instructions that are stored in a non-transitory computer-readable storage device. The program instructions are executable by one or more processors to perform the operations described herein with respect to the process 670. The program instructions may be stored in a memory device (e.g., by transferring them from the non-transitory computer-readable storage device to a random-access memory device or other memory device) and the processor may access the instructions from the memory device to execute the program instructions. The instructions cause performance of the process 670 by the computing device. Alternatively, the process 670 can be implemented directly in hardware, firmware, or software, circuitry, or a combination thereof.

Operation 671 includes determining a first distribution for a motion dynamics parameter according to a first uncertainty value. As explained with respect to the motion dynamics parameters 330, the first distribution is a statistical distribution of values, and the first uncertainty value measures an amount of variability in the values.

Operation 672 includes performing iterations of a first training operation for a machine learning model using a simulator and the first distribution for the motion dynamics parameter, wherein each iteration of the first training operation includes determining a first sampled value from the first distribution and controlling a simulation using the first sampled value.

Operation 673 includes determining a second distribution for the motion dynamics parameter according to a second uncertainty value, wherein the second uncertainty value represents a higher level of uncertainty than the first uncertainty value. As explained with respect to the motion dynamics parameters 330, the second distribution is a statistical distribution of values, and the second uncertainty value measures an amount of variability in the values.

Operation 674 includes performing iterations of a second training operation for the machine learning model using a simulator and the first distribution for the motion dynamics parameter, wherein each iteration of the second training operation includes determining a second sampled value from the second distribution and controlling the simulation using the second sampled value.

Each iteration of the first training operation that is performed in operation 672 may include causing a simulated actor to perform a task in the simulation according to the first sampled value from the first distribution. Each iteration of the first training operation that is performed in operation 673 may include determining a first training signal based on the simulation and modifying the machine learning model according to the first training signal.

Each iteration of the second training operation that is performed in operation 674 may include causing the simulated actor to perform the task in the simulator according to the second sampled value. Each iteration of the second training operation that is performed in operation 674 may include determining a second training signal based on the simulation and modifying the machine learning model according to the second training signal.

Some implementations of the process 670 also include initially training the machine learning model using a demonstration of a physical task. The demonstration of the physical task may include a video that depicts a human actor performing the physical task.

Some implementations of the process 670 may also include controlling a robotic system using the machine learning model.

Training may continue in the manner described in operations 673 and 674 using increasing levels of uncertainty. In particular, training may continue by sampling motion dynamics parameters having a higher level of uncertainty in the manner described in operation 673 and performing additional training iterations in the manner described in operation 674.

Figure 7:
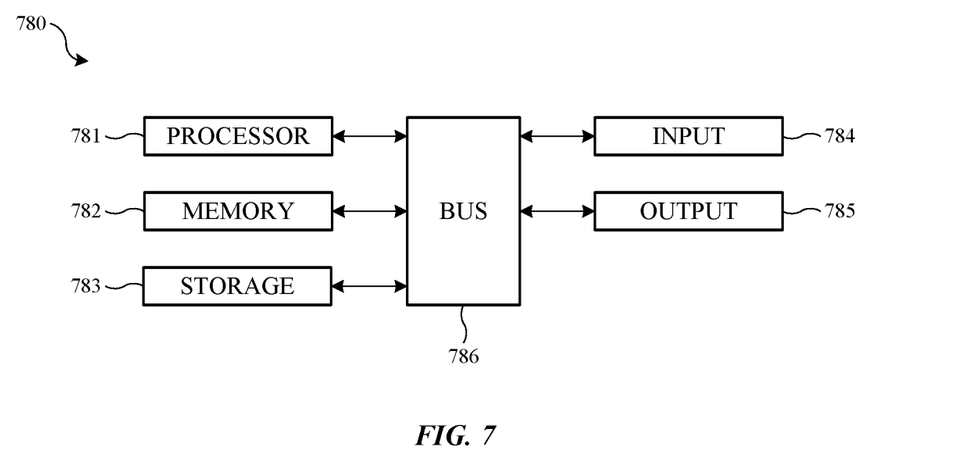
FIG. 7 is an illustration that shows an example of a hardware configuration for a computing device.

FIG. 7 is an illustration that shows an example of a hardware configuration for a computing device that can be used to implement the system described herein. The computing device 780 may include a processor 781, a memory 782, a storage device 783, one or more input devices 784, and one or more output devices 785. The computing device 780 may include a bus 786 or a similar device to interconnect the components for communication. The processor 781 is operable to execute computer program instructions and perform operations described by the computer program instructions. As an example, the processor 781 may be a conventional device such as a central processing unit. The memory 782 may be a volatile, high-speed, short-term information storage device such as a random-access memory module. The storage device 783 may be a non-volatile information storage device such as a hard drive or a solid-state drive. The input devices 784 may include any type of human-machine interface such as buttons, switches, a keyboard, a mouse, a touchscreen input device, a gestural input device, or an audio input device. The output devices 785 may include any type of device operable to provide an indication to a user regarding an operating state, such as a display screen or an audio output.

As described above, one aspect of the present technology is the gathering and use of data available from various sources to train robotic systems to perform tasks. The present disclosure contemplates that in some instances, this gathered data may include personal information data that uniquely identifies or can be used to contact or locate a specific person. Such personal information data can include location-based data, images, addresses, and so forth.

The present disclosure recognizes that the use of such personal information data, in the present technology, can be used to the benefit of users. For example, the personal information data can be used to allow a user to demonstrate performance of a task to a robotic system so that the user can perform the task for the user.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of object detection, the present technology can be configured to allow users to select to "opt in" or "opt out" of participation in the collection of personal information data during registration for services or anytime thereafter. In another example, users can select not to provide personal information for use in aiding object detection. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, object detection can be based on non-personal information data or a bare minimum amount of personal information, such as the content being requested by the device associated with a user, other non-personal information available to the object detection system, or publicly available information.

What is claimed is:

1. A method, comprising:
   determining motion imitation information for causing a system to imitate a physical task using a first machine learning model that is trained using motion information that represents a performance of the physical task;
   determining a predicted correction based on the motion information and a current state from the system using a second machine learning model that is trained using the motion information;
   determining an action to be performed by the system based on the motion imitation information and the predicted correction; and
   controlling motion of the system in accordance with the action.

2. The method of claim 1, wherein the motion information is based on a video that shows a demonstration of the physical task by an actor.

3. The method of claim 2, wherein the motion information describes positions of parts of the actor at each of multiple time steps.

4. The method of claim 1, wherein determining the predicted correction based on the motion information and the current state from the system comprises determining an encoded representation based on the motion information.

5. The method of claim 4, wherein the encoded representation is provided to the second machine learning model as an input.

6. The method of claim 1, wherein determining the predicted correction based on the motion information and the current state from the system comprises determining a tracking error that represents a difference between the current state and the motion information, wherein the tracking error is provided to the second machine learning model as an input.

7. The method of claim 1, wherein the system is a simulated system and an error value for the simulated system is used as a supervision signal for reinforcement learning.

8. A non-transitory computer-readable storage device including program instructions executable by one or more processors that, when executed, cause the one or more processors to perform operations, the operations comprising:
   determining motion imitation information for causing a system to imitate a physical task using a first machine learning model that is trained using motion information that represents a performance of the physical task;
   determining a predicted correction based on the motion information and a current state from the system using a second machine learning model that is trained using the motion information;
   determining an action to be performed by the system based on the motion imitation information and the predicted correction; and
   controlling motion of the system in accordance with the action.

9. The non-transitory computer-readable storage device of claim 8, wherein the motion information is based on a video that shows a demonstration of the physical task by an actor.

10. The non-transitory computer-readable storage device of claim 9, wherein the motion information describes positions of parts of the actor at each of multiple time steps.

11. The non-transitory computer-readable storage device of claim 8, wherein determining the predicted correction based on the motion information and the current state from the system comprises determining an encoded representation based on the motion information.

12. The non-transitory computer-readable storage device of claim 8, wherein determining the predicted correction based on the motion information and the current state from the system comprises determining a tracking error that represents a difference between the current state and the motion information, wherein the tracking error is provided to the second machine learning model as an input.

13. The non-transitory computer-readable storage device of claim 8, wherein the system is a simulated system and an error value for the simulated system is used as a supervision signal for reinforcement learning.

14. An apparatus, comprising:
a memory; and
one or more processors that are configured to execute instructions that are stored in the memory, wherein the instructions, when executed, cause the one or more processors to:
determine motion imitation information for causing a system to imitate a physical task using a first machine learning model that is trained using motion information that represents a performance of the physical task;
determine a predicted correction based on the motion information and a current state from the system using a second machine learning model that is trained using the motion information;
determine an action to be performed by the system based on the motion imitation information and the predicted correction; and
control motion of the system in accordance with the action.

15. The apparatus of claim 14, wherein the motion information is based on a video that shows a demonstration of the physical task by an actor.

16. The apparatus of claim 15, wherein the motion information describes positions of parts of the actor at each of multiple time steps.

17. The apparatus of claim 14, wherein the instructions that cause the one or more processors to determine the predicted correction based on the motion information and the current state from the system further cause the one or more processors to determine an encoded representation based on the motion information.

18. The apparatus of claim 14, wherein the instructions that cause the one or more processors to determine the predicted correction based on the motion information and the current state from the system further cause the one or more processors to determine a tracking error that represents a difference between the current state and the motion information, wherein the tracking error is provided to the second machine learning model as an input.

19. The apparatus of claim 14, wherein the system is a simulated system and an error value for the simulated system is used as a supervision signal for reinforcement learning.

20. The apparatus of claim 14, wherein the system is a robotic system.

* * * * *